United States Patent
Shalunov et al.

(10) Patent No.: US 9,705,957 B2
(45) Date of Patent: Jul. 11, 2017

(54) VIRTUAL CHANNEL JOINING

(71) Applicant: Open Garden Inc., San Francisco, CA (US)

(72) Inventors: Stanislav Shalunov, Lafayette, CA (US); Gregory Hazel, San Francisco, CA (US); Micha Benoliel, San Francisco, CA (US)

(73) Assignee: Open Garden Inc., Oakland, CA (US)

( * ) Notice: Subject to any disclaimer, the term of this patent is extended or adjusted under 35 U.S.C. 154(b) by 533 days.

(21) Appl. No.: 13/944,756

(22) Filed: Jul. 17, 2013

(65) Prior Publication Data

US 2014/0250204 A1 Sep. 4, 2014

Related U.S. Application Data

(60) Provisional application No. 61/772,489, filed on Mar. 4, 2013.

(51) Int. Cl.
| | |
|---|---|
| G06F 15/16 | (2006.01) |
| H04L 29/08 | (2006.01) |
| H04L 29/06 | (2006.01) |
| H04W 74/02 | (2009.01) |
| H04W 76/02 | (2009.01) |
| H04W 88/06 | (2009.01) |

(52) U.S. Cl.
CPC ............ *H04L 67/02* (2013.01); *H04L 67/104* (2013.01); *H04L 69/14* (2013.01); *H04W 74/02* (2013.01); *H04W 76/025* (2013.01); *H04L 67/1008* (2013.01); *H04L 67/1023* (2013.01); *H04W 88/06* (2013.01)

(58) Field of Classification Search
None
See application file for complete search history.

(56) References Cited

U.S. PATENT DOCUMENTS

| | | |
|---|---|---|
| 6,230,231 B1 | 5/2001 | DeLong et al. |
| 6,553,393 B1 | 4/2003 | Eilbott et al. |

(Continued)

FOREIGN PATENT DOCUMENTS

| | | |
|---|---|---|
| CN | 104838364 A | 8/2015 |
| CN | 105247504 A | 1/2016 |

(Continued)

OTHER PUBLICATIONS

Office Action for U.S. Appl. No. 13/646,617 dated Sep. 25, 2014.
(Continued)

*Primary Examiner* — Padma Mundur
(74) *Attorney, Agent, or Firm* — Davis Wright Tremaine LLP; Philip H. Albert

(57) ABSTRACT

Methods for establishing connection to the Internet using multiple channels. A device takes advantage of several channels available to it internally and/or from neighboring devices to request the various resources of the webpage, and assembles the webpage using the resources arriving from the different channels. When a device has the ability to connect to the Internet using multiple internal channels, the device uses internal heuristics to request the webpage resources using these channels. A cloud exit server may be used to enhance security and to handle requests that may not be handled using multiple channels.

10 Claims, 5 Drawing Sheets

(56) References Cited

U.S. PATENT DOCUMENTS

| | | |
|---|---|---|
| 7,831,692 B2 | 11/2010 | French et al. |
| 8,023,929 B2 | 9/2011 | Mgrdechian et al. |
| 8,284,782 B1 | 10/2012 | Maufer et al. |
| 8,284,783 B1 | 10/2012 | Maufer et al. |
| 8,504,062 B2 | 8/2013 | Weiss |
| 9,049,537 B2 | 6/2015 | Shalunov et al. |
| 2001/0042171 A1 | 11/2001 | Vermeulen |
| 2002/0010761 A1 | 1/2002 | Carneal et al. |
| 2002/0073249 A1 | 6/2002 | French et al. |
| 2003/0131082 A1 | 7/2003 | Kachi |
| 2004/0088375 A1 | 5/2004 | Sethi et al. |
| 2005/0080884 A1 | 4/2005 | Siorpaes et al. |
| 2005/0250507 A1 | 11/2005 | Leung et al. |
| 2006/0072151 A1 | 4/2006 | Amani et al. |
| 2006/0080659 A1 | 4/2006 | Ganji |
| 2006/0098588 A1 | 5/2006 | Zhang et al. |
| 2006/0245530 A1 | 11/2006 | Pradhan et al. |
| 2006/0253735 A1 | 11/2006 | Kwak et al. |
| 2007/0123166 A1 | 5/2007 | Sheynman et al. |
| 2007/0242637 A1 | 10/2007 | Dynarski et al. |
| 2007/0279379 A1 | 12/2007 | Stefanik et al. |
| 2008/0114773 A1 | 5/2008 | Choi et al. |
| 2008/0165701 A1 | 7/2008 | Ananthanarayanan et al. |
| 2008/0183305 A1 | 7/2008 | Foster et al. |
| 2008/0235239 A1 | 9/2008 | Penton et al. |
| 2009/0022095 A1* | 1/2009 | Spaur .................. H04L 12/5692 370/329 |
| 2009/0089322 A1 | 4/2009 | Naaman |
| 2009/0106355 A1 | 4/2009 | Harrow et al. |
| 2009/0117949 A1 | 5/2009 | Allen, Jr. et al. |
| 2009/0182941 A1 | 7/2009 | Turk |
| 2009/0271293 A1 | 10/2009 | Parkhurst et al. |
| 2009/0275367 A1 | 11/2009 | Reinisch et al. |
| 2009/0323519 A1* | 12/2009 | Pun .......................... H04L 45/20 370/225 |
| 2010/0015919 A1 | 1/2010 | Tian |
| 2010/0088363 A1 | 4/2010 | Hughes |
| 2010/0318613 A1 | 12/2010 | Souza et al. |
| 2011/0051642 A1 | 3/2011 | Krishnaswamy |
| 2011/0065424 A1* | 3/2011 | Estevez ................. H04W 48/18 455/414.3 |
| 2011/0066676 A1 | 3/2011 | Kleyzit et al. |
| 2012/0005746 A1* | 1/2012 | Wei ..................... H04L 63/0272 726/15 |
| 2012/0021760 A1 | 1/2012 | Strohbach et al. |
| 2012/0030734 A1 | 2/2012 | Wohlert |
| 2012/0110640 A1 | 5/2012 | Donelson et al. |
| 2012/0188980 A1 | 7/2012 | Wang et al. |
| 2012/0190384 A1 | 7/2012 | Marr et al. |
| 2012/0191795 A1 | 7/2012 | Heredia et al. |
| 2012/0198081 A1 | 8/2012 | Zhao et al. |
| 2012/0210000 A1 | 8/2012 | Wood |
| 2012/0311691 A1 | 12/2012 | Karlin et al. |
| 2013/0044640 A1 | 2/2013 | Yen et al. |
| 2013/0045710 A1 | 2/2013 | Raleigh |
| 2013/0058274 A1 | 3/2013 | Scherzer et al. |
| 2013/0061307 A1 | 3/2013 | Livne |
| 2013/0091288 A1 | 4/2013 | Shalunov et al. |
| 2013/0095770 A1 | 4/2013 | Mosheghi |
| 2013/0124619 A1 | 5/2013 | Steakley |
| 2013/0298181 A1 | 11/2013 | Smith et al. |
| 2014/0052497 A1 | 2/2014 | Varghese et al. |
| 2014/0087761 A1 | 3/2014 | Baskin et al. |
| 2014/0241315 A1* | 8/2014 | Niu ..................... H04L 67/1091 370/331 |
| 2014/0307600 A1 | 10/2014 | Dumitrescu et al. |
| 2015/0230172 A1 | 8/2015 | Shalunov et al. |
| 2016/0255056 A1 | 9/2016 | Shalunov et al. |

FOREIGN PATENT DOCUMENTS

| | | | |
|---|---|---|---|
| DE | EP 2280514 A1 * | 2/2011 | ....... H04L 29/12367 |
| EP | 2244525 A2 | 10/2010 | |
| EP | 2904497 A1 | 8/2015 | |
| JP | 2015-537419 A | 12/2015 | |
| JP | 2016-517647 A | 6/2016 | |
| KR | 10-2015-0068413 A | 6/2015 | |
| KR | 10-2015-0139515 A | 12/2015 | |
| WO | 2014/055166 A1 | 4/2014 | |
| WO | 2014/137382 A1 | 9/2014 | |
| WO | 2015/119669 A1 | 8/2015 | |
| WO | 2015/127312 A1 | 8/2015 | |
| WO | 2015/153677 A1 | 10/2015 | |
| WO | 2015/153924 A1 | 10/2015 | |
| WO | 2015/183583 A1 | 12/2015 | |
| WO | 2016/137528 A1 | 9/2016 | |

OTHER PUBLICATIONS

International Search Report and Written Opinion for PCT/US2013/056129 dated Nov. 29, 2013.
International Search Report and Written Opinion for PCT/US2013/056123 dated May 2, 2014.
Invitation to Pay Additional Fees for PCT/US2013/056123 dated Feb. 6, 2014.
International Preliminary Report on Patentability for PCT/US2013/056129 dated Apr. 16, 2015.
International Preliminary Report on Patentability for PCT/US2013/056123 dated Sep. 17, 2015.
Office Action for U.S. Appl. No. 14/231,590 dated Sep. 25, 2015.
International Search Report and Written Opinion for PCT/US2015/016965 dated May 27, 2015.
Invitation to Pay Additional Fees for PCT/US2015/023698 dated Jun. 25, 2015.
International Search Report and Written Opinion for PCT/US2015/023698 dated Aug. 19, 2015.
International Search Report and Written Opinion for PCT/US2015/024173 dated Jul. 13, 2015.
Invitation to Pay Additional Fees for PCT/US2015/030878 dated Jul. 23, 2015.
International Search Report and Written Opinion for PCT/US2015/030878 dated Oct. 1, 2015.
International Search Report and Written Opinion for PCT/US2015/043023 dated Nov. 2, 2015.
Invitation to Pay Additional Fees for PCT/US2014/058917 dated Dec. 11, 2014.
Notice of Allowance for U.S. Appl. No. 13/646,617 dated Jan. 22, 2015.
International Search Report and Written Opinion for PCT/US2014/058917 dated Feb. 24, 2015.
Extended Search Report for European Patent Application No. 13844491.4 dated May 3, 2016.
Office Action for U.S. Appl. No. 14/231,590 dated Mar. 24, 2016.
Notice of Allowance for U.S. Appl. No. 14/231,590 dated Jul. 19, 2016.
International Preliminary Report on Patentability for PCT/US2014/058917 dated Aug. 18, 2016.
International Preliminary Report on Patentability for PCT/US2015/016965 dated Sep. 1, 2016.
International Preliminary Report on Patentability for PCT/US2015/023698 dated Oct. 13, 2016.
International Preliminary Report on Patentability for PCT/US2015/024173 dated Oct. 13, 2016.

* cited by examiner

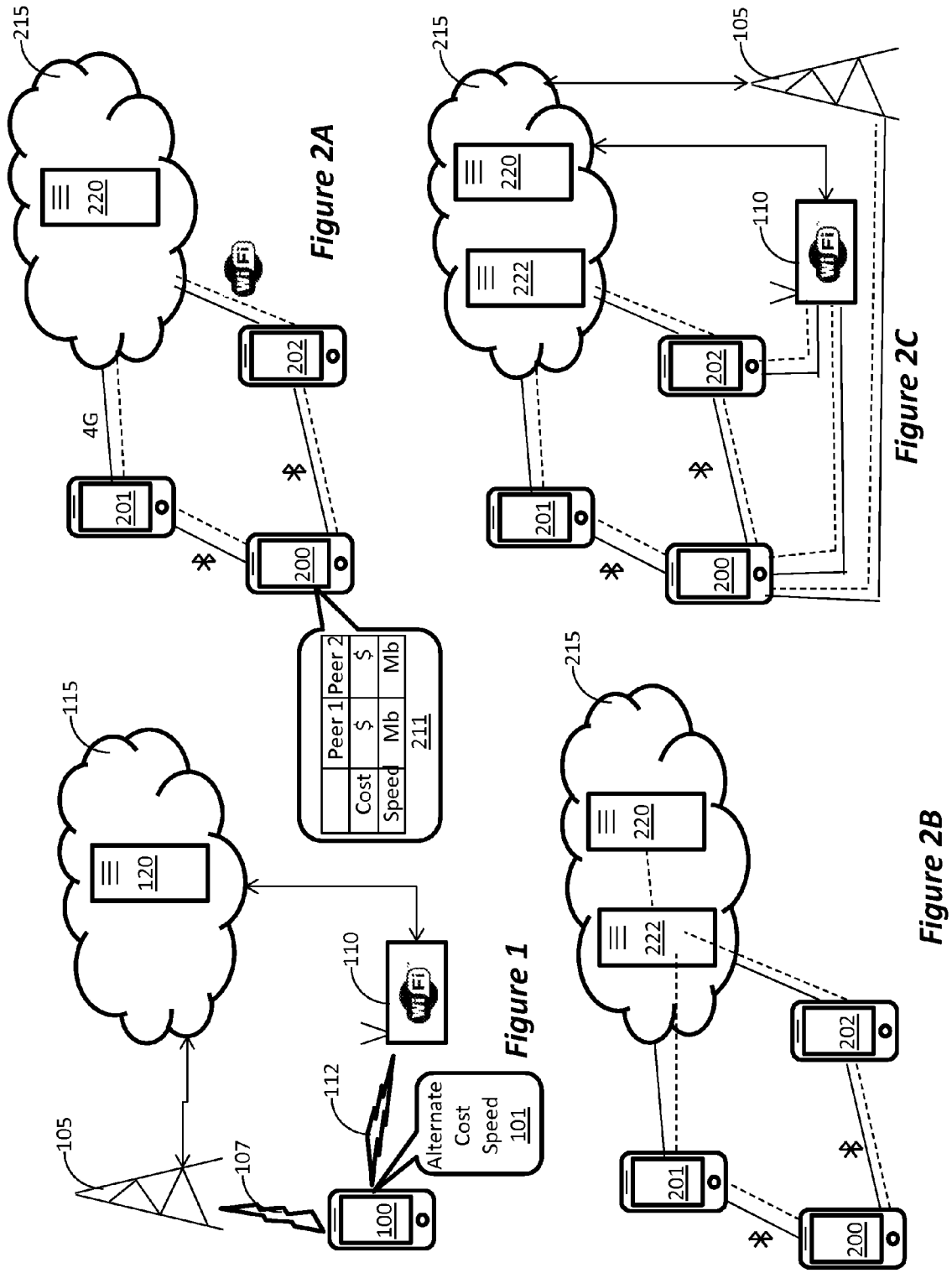

VIRTUAL CHANNEL JOINING

RELATED APPLICATIONS

This application relates to and claims priority from U.S. Provisional Application, Ser. No. 61/772,489, filed on Mar. 4, 2013, the disclosure of which is incorporated herein by reference in its entirety.

BACKGROUND

1. Field

This disclosure relates to wireless connectivity, especially to establishing connectivity using multiple channels.

2. Related Arts

Various wired and wireless technologies are available for accessing networks, such as the Internet. For example, state of the art smartphones can access the Internet using 3G, 4G, WiFi, and similar wireless technologies. Additionally, wireless technologies enable inter-connectivity among two or more devices. Such technologies include Near Field Communication (NFC), WiFi Direct, Bluetooth, and others.

Tethering is a connection procedure that requires significant user involvement and knowledge, such that it generally remains within the realm of a "geek feature," utilized mainly by tech savvy users. Tethering is mostly used to connect a computer to a cellphone in order to gain access to the Internet via the cellular network, when WiFi or other Internet connection is not available. In addition to requiring user involvement in establishing tethering, various carriers and phone manufacturers place barriers to tethering, leading to various by-pass "creativity," such as rooting Android devices or jailbreaking iOS devices and installing a tethering application on the device.

Generally, when an application requires an access to the Internet, the device selects one of the available channels, e.g., WiFi, and performs all communications required by the application on the selected channel. For example, when a browser on a smartphone requests a page, all of the resources for that page are requested and received on one channel, e.g., WiFi, although other channels are available, e.g., 4G.

Also, different devices may utilize different carriers, such that in a single location there may be several devices, each utilizing different carrier and thus having different level of service.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Various disclosed embodiments provide methods for establishing connection to the Internet using multiple channels. A device takes advantage of several channels available to it internally and/or from neighboring devices to request the various resources of the webpage, and assembles the webpage using the resources arriving from the different channels. The embodiments may be implemented as a client running on a device, e.g., an app running on a mobile device such as a smartphone or tablet. As a shorthand, this client may be referred to herein sometimes as Open Garden app. The Open Garden app runs on the mobile device along other apps, and monitors other apps executing on the mobile device. When an app attempts to communicate with external devices, e.g., a server on the Internet, Open Garden intercepts the communication request and determine how best to send the request to the external devices. Open Garden may also intercept incoming communication from external devices and determine whether to route the communication internally, i.e., to which app to forward that communication, or whether it needs to be forwarded to another external device.

When a device has the ability to connect to the Internet using multiple internal channels, the device uses internal heuristics to request the webpage resources using these channels. For example, a smartphone device has a cellular network radio and a WiFi radio. However, conventionally the smartphone would use only one of these channels to connect to the Internet and request webpage resources. According to disclosed embodiments, the smartphone would use both of these channels to request webpage resources and then assemble and display the webpage using the resources received via both channels.

According to other embodiments, a device may also request webpage resources using other devices, thereby utilizing multiple channels. For example, one smartphone device may have Bluetooth connection to another smartphone device. The first smartphone may utilize its own internal channels (e.g., cellular and WiFi) to request webpage resources, but also use its Bluetooth connection to the second smartphone to request other webpage resources using the second smartphone channels.

According to some embodiments, the mobile device utilizes the various channels to request webpage resources by having each channel using its own unique IP address. The requested webpage resources are returned to each requesting IP address, all of which lead to the requesting device. The requesting device then assembles the webpage using the returned resources. On the other hand, according to other embodiments, such as for a secure page (https:), the target device must see the requests as originating from a single IP address. To achieve that, a cloud exit server is connected to the Internet. All requests from all of the mobile device channels are addressed to the cloud exit server. The cloud exit server forwards the requests to the appropriate host using a single IP address, i.e., the cloud exit server own address. Thus, from the target host's perspective, all of the requests are coming from a single IP address, i.e., a single device. Thus, the host returns the requested resources to the requesting IP address, which is the cloud exit server IP address. The cloud exit server then forwards the received resources to the appropriate requesting IP addresses. Thus, from the mobile device perspective, the requests are sent and the resources are received using multiple channels.

The various disclosed embodiments enable multi-path access to the Internet, to provide higher reliability and bandwidth. Additionally, the various embodiments enable eliminating configuration choices: users will no longer need to pick how their device connects to the Internet, since the devices will simply use multiple ways simultaneously. Moreover, the devices automatically find the available path to the Internet. For example, if a path fails, a new one will be chosen and new connections will be established. Consequently, the network is self-healing and self-forming. Each of the nodes operates only with local knowledge, but together the connected devices build a network using a probabilistic distributed algorithm. Using the mesh network, when there is no direct Internet connection, devices will access the Internet through chains of other devices. If necessary, the chains will grow by connecting to other devices so as to reach the Internet. The described embodiments enable users to access the Internet using the most appropriate connection, without configuring their devices or jumping through hoops. The embodiments also enable users to access Internet as cheaply as possible. Users can find the fastest connection and most powerful signal without checking every available network, and can move between networks seamlessly. The embodiments provide ways to access more data at faster speeds in more locations. The users become part of the network, sharing connections when and where they provide the best possible access. This results in higher quality streaming video and audio, more immediate multiplayer gaming, and faster downloads.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 1 is a schematic diagram illustrating a mobile device requesting web resources using multiple internal channels, according to one embodiment.

FIG. 2A is a schematic diagram illustrating a mobile device requesting web resources using multiple external channels, according to one embodiment.

FIG. 2B is a schematic diagram illustrating a mobile device requesting web resources using multiple external channels and a cloud exit server, according to one embodiment.

FIG. 2C is a schematic diagram illustrating a mobile device requesting web resources using multiple internal and external channels, according to one embodiment.

DETAILED DESCRIPTION

Figure 2E:
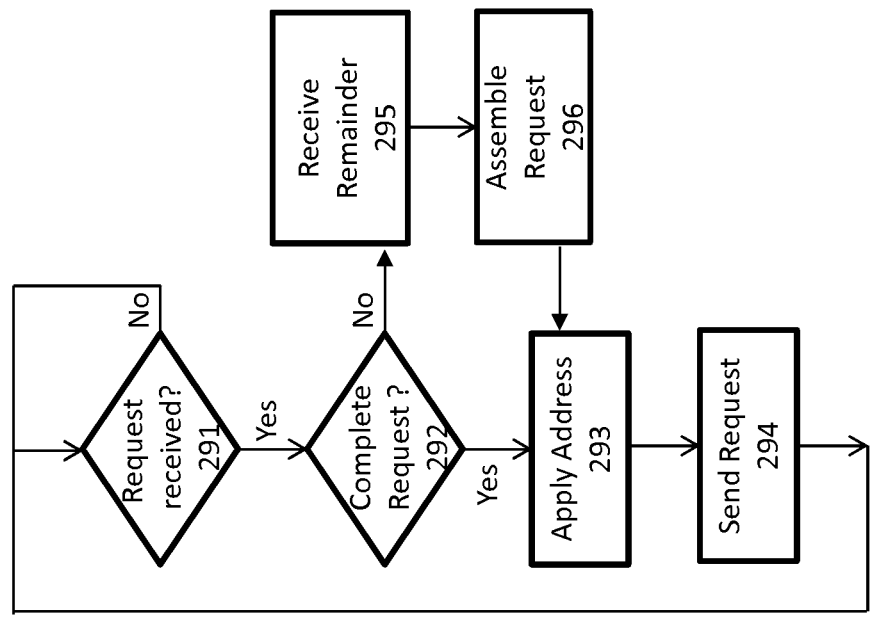
FIG. 2E is a schematic diagram illustrating example of a process flow that may be executed by cloud exit server according to one embodiment.

The following provides examples of methods and systems for establishing Internet communication utilizing several channels in parallel.

Virtual channel joining is a computer networking technique that allows increasing the reliability, speed, and availability of an Internet connection of a computer, smartphone, tablet, or another device, when more than one Internet connection is possible. The particular device itself may have multiple Internet connections available to it, or each device may only have one connection, but by accessing the Internet collectively and networking locally via mesh network, the devices achieve virtual channel joining Virtual channel joining may benefit from, but does not require, any network devices (such as switches or routers) to change their behavior or specification and is, therefore, easy to deploy. However, since it can be employed by network devices along with end systems, such as computers, smartphones, tablets, smart TVs, or other devices, it can be used to significantly improve Internet connectivity at larger scale. Virtual channel joining can also enhance existing means of device-to-device communication on a local network or provide sole means for it.

In the prior art, each enabled device access the Internet using its own resources. When Internet connection fails, the device no longer can access the Internet until it reestablishes the connection or discovers and establishes another connection. Such devices utilize a single channel for connecting and communicating with the Internet. For example, a 4G enabled smartphone would connect and communicate with the Internet using the 4G connection. However, if the smartphone discovers and connects to a WiFi connection, the smartphone would connect and communicate with the Internet using the WiFi connection and not the 4G connection. That is, so long as the WiFi connection is available, the device would use that channel for all Internet communication. However, that particular channel may be slow or other channels that are available internally or externally may provide better fidelity. Moreover, parallel communication over multiple channels can enhance the speed and fidelity of the Internet communication.

In this context, a mesh network is a network established through ad hoc links directly between devices and can be used to communicate locally between the devices comprising the mesh network. In some instances, the mesh networks can be coordinated by servers on the Internet. According to disclosed embodiments, virtual channel joining can take advantage of mesh networking as one of the means of establishing additional connections between devices and provide additional channels for Internet connection and communication. For this purpose the mesh network can use any physical medium to establish the peer-to-peer or local connections, from wired connections, such as Ethernet, to wireless, such as Wi-Fi in access point or ad hoc mode, Wi-Fi Direct, Bluetooth, ZygBee, NFC, 3G technologies, or various 4G technologies such as LTE and WiMAX. The exact nature of the underlying technologies can be taken into account by virtual channel joining, but any underlying networking technology can be used. Note that any combination of mesh networks is also, by definition, a mesh network, even if it happens to be disconnected.

FIG. 1 illustrates an environment wherein a communication device 100, such as a smartphone or a tablet has the capability to communicate with server 120, coupled to Internet 115, using either WiFi 110 access point using wireless connection 112, or using the cellular network 105, using protocols such as 3G, 4G, LTE, and similar. For example, cellular network 105 may be standard wireless telephony system of a wireless communication provides, while WiFi 100 access point 110 may be a wireless router connected to the Internet via, e.g., a cable or land-based telephone line. Generally, such communication is performed using either of the available connections 107 or 112. For most mobile devices, if WiFi access 112 is available, all communications with server 120 would be over the WiFi connection. For example, when a smartphone detects the presence of a WiFi router, if the smartphone recognizes the WiFi router it may connect to it automatically, or, if it doesn't recognize it, it may ask the user whether to connect. On the other hand, if WiFi connection 112 is not available, then the cellular connection 107 would be used for all of the communications, i.e., voice and data. One of the reasons for this arrangement is that a connection to the Internet requires an IP address, so that the server 120 "knows" who it is communicating with. Thus, the standard TCP-IP limits the device 100 to communicate with the Internet via a single connection only, i.e., cellular connection 107 or WiFi connection 112. This limitation is alleviated as described below.

In the embodiment of FIG. 1, the processor of device 100 executes special instructions (e.g., a client app) that enable it to communicate with the Internet and server 120 using both cellular channel 107 and WiFi channel 112. For example, when a browser on device 100 attempts to download a webpage from server 120, the process would entails sending repeated requests for various resources that comprise the webpage, e.g., text, images, Java scripts, and other resources. However, rather than sending all of the requests using a single channel, as is done in the prior art, the processor utilizes an allocation mechanism to send the various requests using both channels 107 and 112. As the requests arrive at server 120, the server gets requests from two different IP addresses; however, as far as the server 120 is concerned, this is irrelevant: the server simply sends each requested resource to the specific requesting address. As the resources arrive at device 100, they are cached and assembled together to form the requested webpage. That is, the processor of device 100 knows that all of the resources arriving on both channels relate to the sent requests and together comprise the requested webpage.

As far as selecting which request to send on which channel, various algorithms or heuristics can be employed, as exemplified by callout 101. For example, the simple one would be to alternate between the channels, such that each request is sent on a different channel from the previous request. Another example it to take into account the operational speed of each channel and send the requests according to the operational speeds. In one example, requests for heavy resources, such as images and video, are sent via the fast channel, while light resources, such as text, are sent via the slower channel. According to another example, the service cost of each channel is taken into consideration, e.g., heavy resources are requested via the cheaper channel, while light resources are sent via the more expensive channel.

In the example of FIG. 1, device 100 is an end system, in that it requests and receives resources from other devices, but it does not send resources to any other device, i.e., it does not serve as an intermediary or Internet access point for any other device. This is not a requirement of the embodiment, but makes it easier to explain it. In most of the description that follows, such an example will be utilized in order to make the explanation simple and clear. However, the requesting device need not always be an end system. Rather, the device may request web resources for itself, but may also request web resources for relaying to other devices in the mesh network.

In the system of FIG. 1, the mobile device 100 communicates directly with the Internet using its internal channels. However, at times it may not be possible or desirable to communicate using the mobile device internal channels. For example, during overseas travel, using mobile device 100 to communicate directly with the Internet may be prohibitively expensive or beyond one's service provider agreement. This problem is alleviated by employing the example illustrated in FIG. 2A.

In FIG. 2A, mobile device 200 requests and receives web resources from server 220, without having direct connection to the Internet. For example, device 200 may be a smartphone of a user traveling in a foreign country and being unable or unwilling to connect to the local wireless provider network. Therefore, in this example, mobile device 200 utilizes peer-to-peer connections to establish a mesh network with devices 201 and 202 using, e.g., Bluetooth, NFC, and similar protocols. For illustration purposes, two Bluetooth connections are shown, one connecting device 200 to device 201 and one connecting device 200 to device 202. Device 200 uses the peer-to-peer connections to instruct the processors in devices 201 and 202 to request the web resources, each using its own IP address, and forward the received resources to the originating device 200 over the peer-to-peer network.

In the schematic of FIG. 2A, solid line indicates a physical layer connection, while dashed line indicates data communication. As can be seen, device 200 has both physical layer and data communication with both devices 201 and 202. In the specific example of FIG. 2A, both connections are identified as Bluetooth connection, but other peer-to-peer protocols may be used. Conversely, in the specific example of FIG. 2A, device 201 communicates with the Internet using 4G cellular network, while device 202 communicates with the Internet over a WiFi connection.

As in the example of FIG. 1, device 200 may use various conventions or heuristics to determine which request to send via which device. For example, device 200 can measure the response time, and thereby the bandwidth, of each device in the mesh network and utilize this information in allocating requests. Also, each device in the mesh network may communicate its bandwidth cost, and the requesting device may use that information in determining the allocation of web resources requests. For example, device 200 may maintain a table listing the cost and connection speed of each peer it is communicating with and use the table to determine which peer to use for each originating request.

The embodiments of FIGS. 1 and 2A assume that the server 120 or 220 is capable of servicing different web resource requests from different web addresses. However, in certain situations this is not possible. For example, encrypted requests, e.g., https, or instant communication requests, e.g., Skype®, must be handled using a single IP address. The example of FIG. 2B illustrates how a device can send web resources requests on multiple channels, in a situation where the server 220 must serve the requests using a single IP address.

In the example of FIG. 2B, device 200 forms a mesh network with device 201 and 202, and uses those devices to obtain resources from the Internet, e.g., server 220. However, in this specific example it is not possible to service the requests using two different IP addresses. Accordingly, in this example a cloud exit server 222 is used to receive the requests and relay the requests to the target device, e.g., server 220, using a single IP address. When the target device returns the requested resource to the cloud exit server 222, using the single IP address of cloud exit server 222, cloud exit server 222 sends the response to the originating device 200, either via the IP addresses from where the request arrived or via other channels.

In one example, the processor of device 200 executes instructions for operating the web requests. In this example this is accomplished by device 200 running an application, referred to herein as Open Garden. In all cases where the Open Garden understands the protocol for requesting resources and is able to send requests via multiple paths, device 200 will send the requests using the available channels, as illustrated in the examples of FIGS. 1 and 2A. On the other hand, when Open Garden does not understand the protocol or understands the protocol but cannot split the requests into multiple channels, it encapsulates the request and sends it to the cloud exit. Device 200 can send the request via any channel it chooses, since from the relaying device, e.g., either of devices 201 and 202, the request simply needs to be sent to the IP address of the cloud exit server 222, and these devices simply relay the request to that IP address.

Figure 2D:
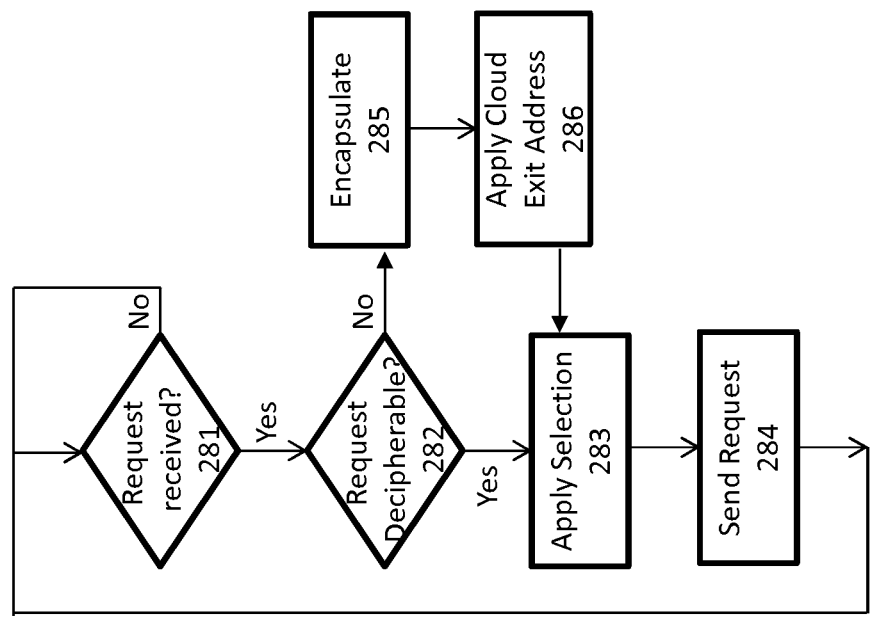
FIG. 2D is a schematic diagram illustrating example of a process flow that may be executed by one embodiment.

An example of a process flow that may be executed by the Open Garden application is illustrated in FIG. 2D. In step 281 the process routinely checks for new requests. At step 282, when a request is received, the process attempts to decipher the request and, if successful, the process proceeds to step 282 to select a channel for sending the request. When the appropriate channel has been selected, the request is sent at step 284. Conversely, if the request cannot be deciphered, the process proceeds to step 285, wherein the request is encapsulated and in step 286 the address of the cloud exit server 222 is applied to the request. The process then proceeds to step 283 to select a channel, and the encapsulated request is sent in step 284.

When the cloud exit server 222 receives the request, it de-encapsulates it and determines what are the address of the originating and target devices. If the packet received is only a partial request, the cloud exit assembles the request from all of the parts received from all of the channels. Once the cloud exit has the entire request, it sends it to the target destination device, e.g., server 220. The destination device receives the request having the cloud exit server address as the originating address. Thus, target device sends the reply to the cloud exit server 222. When cloud exit server 222 receives the reply, it relays it to the originating device 200, either via the intermediate requesting devices, e.g., devices 201 and 202, or via any other appropriate channel it selects. That is, since the cloud exit server 222 knows where the request was originated from, it can send the reply using any available channels.

An example of a process that may be performed by cloud exit server 222 is illustrated in FIG. 2E. After a request is received at step 291, the process proceeds to step 292 to check whether the received request is partial or complete request. If it is a complete request, at step 293 the address of the target server 220 is applied to the request, which is then sent at step 294. On the other hand, if the request is only a partial request, at step 295 the remainder of the request is received and at 296 the entire request is assembled. The process then reverts to step 293 to apply the target's address and to send the request at 294.

Thus, for example, if device 200 sends Request 1 via device 201, using IP address of cloud exit 222 as the destination, and Request 2 via device 202, also using IP address of cloud exit 222 as the destination, devices 201 and 202 will relay the requests using the IP address of cloud exit server 222. When cloud exit server 222 receives Requests 1 and 2, it decapsulates them and finds out that the originating device is device 200 and the target device is server 220. It therefore relays the requests to server 220 using its own IP address as the request originator. When target server 220 receives Requests 1 and 2, having IP address of cloud exit 222 as the originator, it fulfills Request 1 and Request 2 by sending the Reply 1 and Reply 2 to the IP address of cloud exit server 222. When cloud exit server 222 receives Reply 1 and Reply 2, since it knows that the requests were originated from device 200, it can relay the responses to device 200 using any available channel, and not necessarily via devices 201 and 202.

As explained above, device 200 can access the Internet using its own multiple channels. Also, device 200 can access the Internet using channels of multiple connected devices. Device 200 may take advantage of both of these methods simultaneously, i.e., using internal channels and using connected devices. FIG. 2C illustrates an example wherein device 200 utilizes its internal channels to connect to the Internet via cellular network 105 and a WiFi device 110, and also connects to the Internet using two devices 201 and 202, connected in a mesh network. Moreover, each of devices 201 and 202 may also utilize multiple channels to connect to the Internet, and device 200 may take advantage of that as well. For example, FIG. 2C illustrates device 202 connecting to the Internet via a cellular network and via the same WiFi access point 110 (although it could have just as easily used another WiFi access point).

Figure 3:
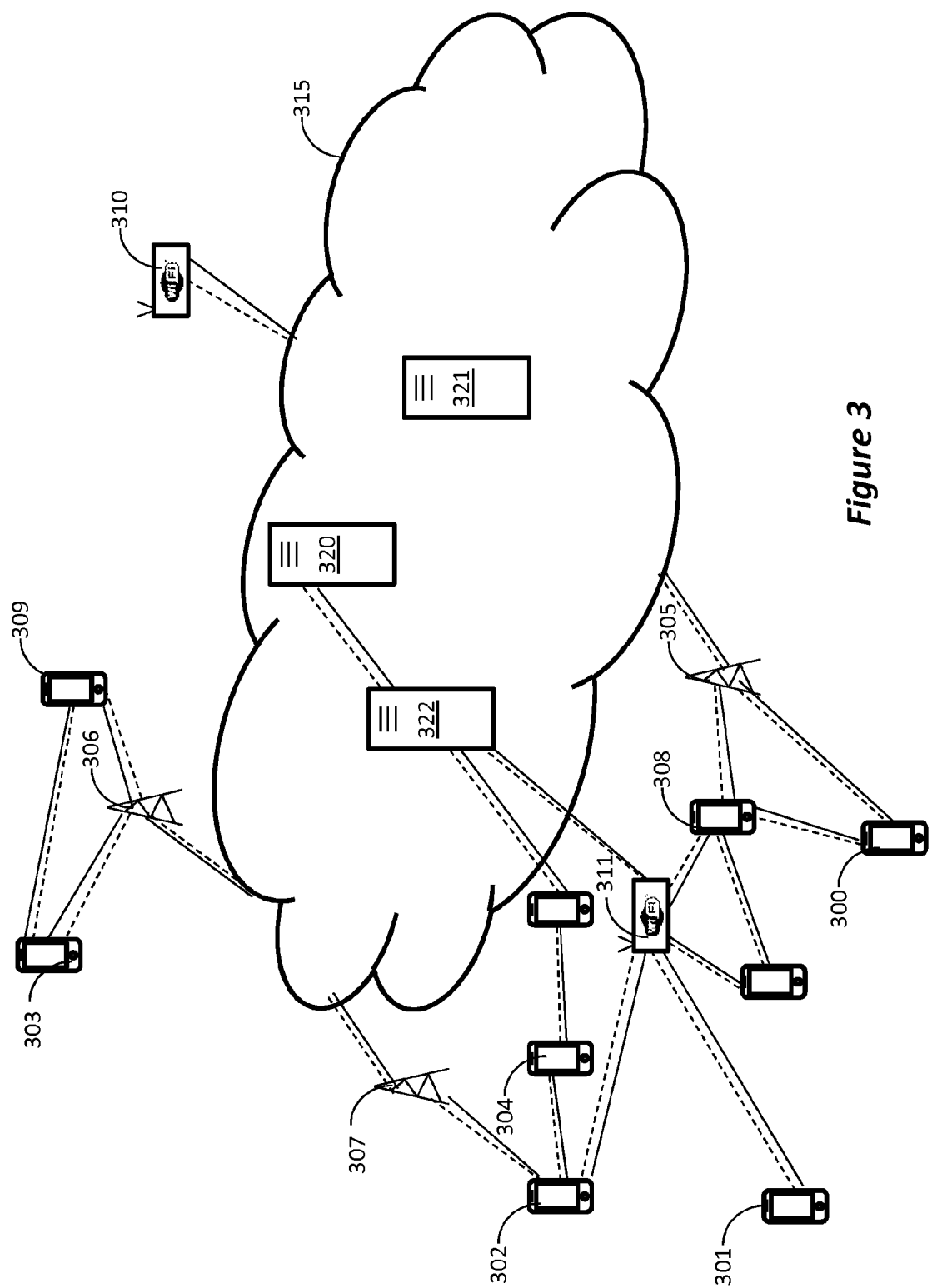
FIG. 3 illustrates an example of an environment for operating multiple connections according to the various embodiments disclosed herein.

FIG. 3 illustrates an example of an environment for operating multiple connections according to the various embodiments disclosed herein. FIG. 3 is as illustration of but a very small part of the entire environment, which may include many devices interconnected in many mesh networks. For example, devices 300, 301 and 302 are connected to one mesh network with other devices, while devices 303 and 309 are interconnected in another mesh network. Device 300 uses its cellular transceiver to communicate with cellular tower 305, and simultaneously uses a second transceiver, e.g., Bluetooth transceiver, to communicate with mobile device 308. Since mobile device 308 is connected to the Internet via WiFi device 311, device 300 may use this connection to communicate with Internet servers, e.g., servers 320 and 321. Moreover, cloud exit server 322 can service traffic which cannot normally be handled using multiple connections, such as, for example, encrypted or VOIP traffic. Thus, device 300 utilizes one channel to communicate with the Internet directly via the cellular network and a second channel to connect to a WiFi device through mobile device 308. On the other hand, device 302 uses three channels: one cellular channel, one WiFi channel, and one channel through its connection to device 304.

Figure 4:
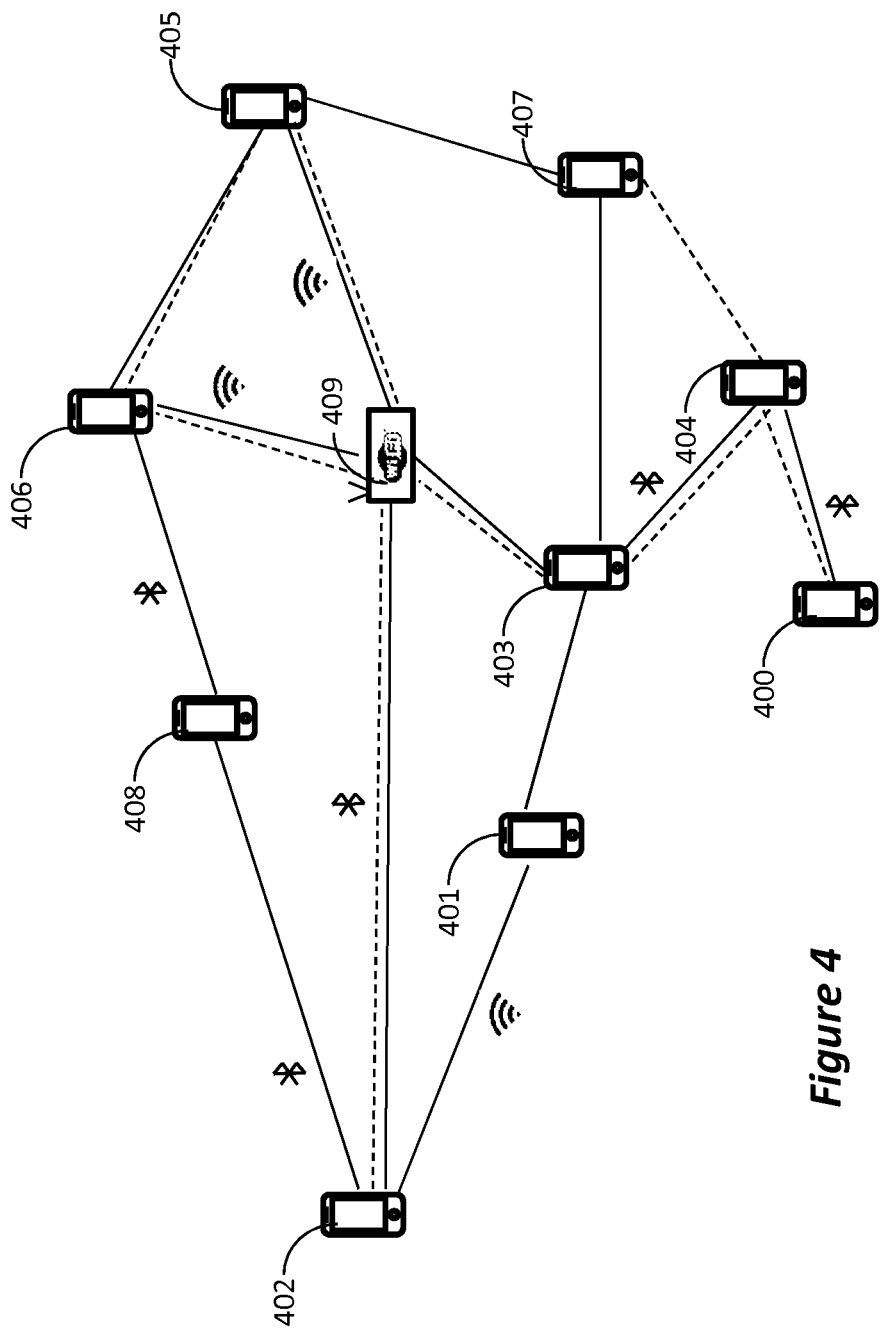
FIG. 4 illustrates and example of a mesh network, wherein several devices utilize multiple channels, according to the various embodiments disclosed herein.

As explained thus far, virtual channel joining improves the speed, reliability, and availability of network connections between devices and of the Internet connections of the devices through several techniques. When possible, virtual channel joining may use mesh networking to connect all devices accessing each other or the Internet together. Notably, the virtual channel joining described this far is beneficial also in environment without, or regardless of having Internet connection. For example, FIG. 4 illustrates an environment showing multiple devices 400-409 interconnected, wherein at least some of the devices, e.g., devices 401-409 utilize multiple channels. Thus, every device in this mesh network can communicate with another device using one or more paths. This can be useful, e.g., in social network setting, in device-to-device direct chatting and texting, and other possible applications. Of course, as soon as one device in the network has access to the Internet, it may function as a gateway to the Internet for all of the other interconnected devices.

In the methods for virtual channel joining as described herein, the communication traffic can be analyzed to understand some of its nature. That is, while conventionally programs deal with traffic on a particular OSI layer and are oblivious of anything happening on higher or lower OSI layer, embodiments of the invention analyze the traffic and make decision as to which OSI layer to use. Specifically, the method looks at the nature of the communication and treats it at that level. For example, the method may detect web (HTTP) requests, DNS requests, BitTorrent traffic, and HTTPS requests and treat each request in a manner that is most efficient for the particular request. Some traffic may not be decipherable and may remain unclassified, but it is normally advantageous to classify as much traffic as possible. The reason is that serving requests on higher OSI layers normally results in better performance.

The following are some examples of how analyzing and classifying the traffic can enhance the communication by taking advantage of virtual channel joining. A first example is when it is determined that the request is idempotent. For example, when detecting HTTP requests that are normally idempotent, such as GET requests, the system can attempt retries, or even send redundant queries on multiple paths. In such a case, the request can be duplicated and sent simultaneously over different channels or different paths. Also, if a response is not received by a certain time, even though the request may have not yet failed, the request can be sent again over the same or different channel. Since the request is idempotent, it doesn't matter for the server that it received multiple requests. On the other hand, if two responses are received, they are guaranteed to be identical, so that the later received one can be discarded. Also, to make sure this implementation is not less reliable than a mobile device operating using only a single channel, referred to as the default channel, the method will attempt to send the first request using the default channel in addition to other channels.

In another example, if it is determined that the request is, for example, a web or a DNS request, a proper reply may already be residing in cache memory of the originating or mesh networked device. Using caching provides a moderate to substantial reduction in network use and in the speed of loading. For DNS requests, the system can provide an additional layer of caching, and similarly intelligently route them as units, even if they do not arrive in one IP packet.

To provide one specific example, if two users are near each other and their mobile devices run a client application according to one of the embodiments described herein, each device can communicate at least using its own cellular network connection, its own WiFi connection and, using a mesh network, each other's cellular and WiFi connections. In such a case, if both users decide to go on, e.g., Facebook, there is really no need for both of the devices to download the Facebook style sheet, since it is always the same—only the content is different for different users. Thus, when a first device downloads the Facebook style sheet, it can store it in the cache memory and when the second device requests the Facebook style sheet, it can be sent to it from the cache of the other device, rather than actually sending the request to the Facebook server.

In the above provided Facebook example, there will be a modest gain in reduction of traffic. However, a much larger gain can result when there is some topical correlation between many users in a mesh network. For example, many users in a conference wanting to view the same presentation slides. Rather than every user downloading the presentation, only one or a few devices can download the presentation and use caching to deliver the presentation to other devices in the mesh network, thus drastically reducing the amount of network traffic.

Note that DNS requests are almost always idempotent. Therefore, if the reply is not present in cache, the system can handle the DNS request using the method of handling idempotent requests described above. Also, since DNS requests are small, the overhead of sending redundant DNS requests is rather low, but the benefit can be in a more robust operation such that the benefit is rather high.

Traffic that is opaque and encrypted is normally processed by the system on IP layer, or, for HTTPS traffic, on TCP layer. The traffic is normally injected into the system at the IP layer, but unlike prior art which would simply send such traffic on the IP layer, the method analyzes the traffic to see if its beneficial to use a different layer. Processing even TCP layer as a byte stream rather than a stream of IP packets can in practice result in drastic performance improvements, since mesh networks can often run over media with relatively high non-congestive packet loss, and thus the performance of the TCP connection may be limited by the packet loss on the mesh network if it is treated as an IP packet stream.

In general, the system can process traffic on several layers: IP layer, where packets are received and forwarded, TCP layer, where a byte stream is received and forwarded, and application layer, where application requests are received and forwarded. It is noted in this context that the benefits of the disclosed embodiments are maximized when the requests can be handled at the highest possible layer, e.g., the application layer. For example, doubling the physical layer connection would not result in higher speeds for receiving responses to given requests. On the other hand, doubling an HTTP or a DNS request can increase the speed and reliability of obtaining the response. Thus, even when a request is injected at the IP layer, it is analyzed to see whether it can be handled at a higher layer, e.g., if it's an HTTP or DNS request.

Priority may be given to applications that comprise a significant fraction of the traffic or a significant fraction of the time the user spends with the application. High-value applications are also added to the set of specially recognized applications. Applications with a non-trivial number of idempotent requests are particularly attractive to recognize for virtual channel joining; the most important examples today are HTTP, DNS, BitTorrent, and HTTPS.

The system may use various parameters to decipher and detect the type of request being sent. For example, the system may look at port number, the type of packets (e.g., TCP, uDP), and the content. A specific example would be, if the request specifies port 80 and the content starts with GET_ABC, then it signifies an HTTP request and can be treated as an HTTP request; or if it's port 53 and it's a uDP packet, it has a layout of a DNS packet, then it can be treated as a DNS packet.

The methods implementing virtual channel joining may satisfy the requests, in some cases, using a different network interface to route the traffic than would be done without it, or in some cases routing the request over the mesh network to a different device with its own Internet access. When using virtual channel joining, it is best for the system to have as many network interfaces as possible enabled on each device. For example, a computer can enable a wired Ethernet connection, Wi-Fi, and a 4G LTE dongle; a smartphone can enable its 4G interface, join a Wi-Fi network, and use Wi-Fi Direct and Bluetooth to join the mesh network.

When implementing any of the methods disclosed herein, since each device may communicate using multiple channels, it is advantageous to provide some methods or heuristics to enable channel or route selection. A variety of route selection engines can be employed to optimize various desired design considerations. For example, when speed is of principal importance, methods that make maximal possible use of all available Internet exits work best, e.g., equal-bytes, equal-requests, bytes-proportional-to-past-performance, and requests-proportional-to-past-performance approaches. Equal requests approach is the simplest and it strives to send roughly equal number of requests to all available Internet exits. It can do so in a variety of ways, for example, picking a random exit for the current request, using a round-robin schedule, or picking random and keeping track of and correcting the resulting additive imbalances (multiplicative imbalances are not possible in the long run due to law of large numbers). Equal bytes approach is a refinement of the equal-requests method, which weighs requests by the number of bytes. This allows more uniform byte distribution among the contributing channels. Bytes proportional to past performance is a method where the system keeps an estimate of past performance of a channel, either based on natural usage, or based on a synthetic test traffic, and weighs the number of bytes that will go down this channel by the past performance estimate. Requests proportional to past performance is a similar technique, but one where the system keeps track of requests rather than bytes.

When conservative reliability is paramount, a queue spill route selector works well. Queue spill maintains a virtual queue within each device that has a direct Internet connection that does not go through other devices. Under the queue spill discipline, these devices, by default, send traffic using the direct Internet connection, the way it would be sent without virtual channel joining Only when the virtual queue of requests reaches a particular threshold, which can be set in advance or based on measurement of behavior of this device, does the device begin to route some requests to other devices in the mesh, so that their Internet connections are also used. Queue spill provides a very conservative system, which prioritizes reliability and availability over speed. A retry strategy that works well with queue spill is to issue retries on the direct connection for still-outstanding requests that go through other devices when slots become accessible in the virtual queue under the limit.

When a typical web page is loaded, many objects (web resources) are typically requested. The methods of virtual channel joining takes advantage of this approach by splitting off the requests to be sent on different paths. Sometimes, however, a single very large object can be requested, such as during a software update download or when HTTP streaming is used to view a video. In this case, the one single item can still be obtained using multiple connections by using HTTP range requests, which allow using multiple requests, i.e., each forming a sub-request of the original request and each requesting only part of a file. Thus, the file is requested in parts, instead of the entire file at once. Each sub-request, i.e., each part, may be requested using any of the available channels. Note that most video streaming services must support range requests to enable skipping and seeking in the video by the user; range requests are thus a completely normal form of request for them to see and work well on YouTube, Netflix, Vimeo, and all Akamai-served sites.

Figure 5:
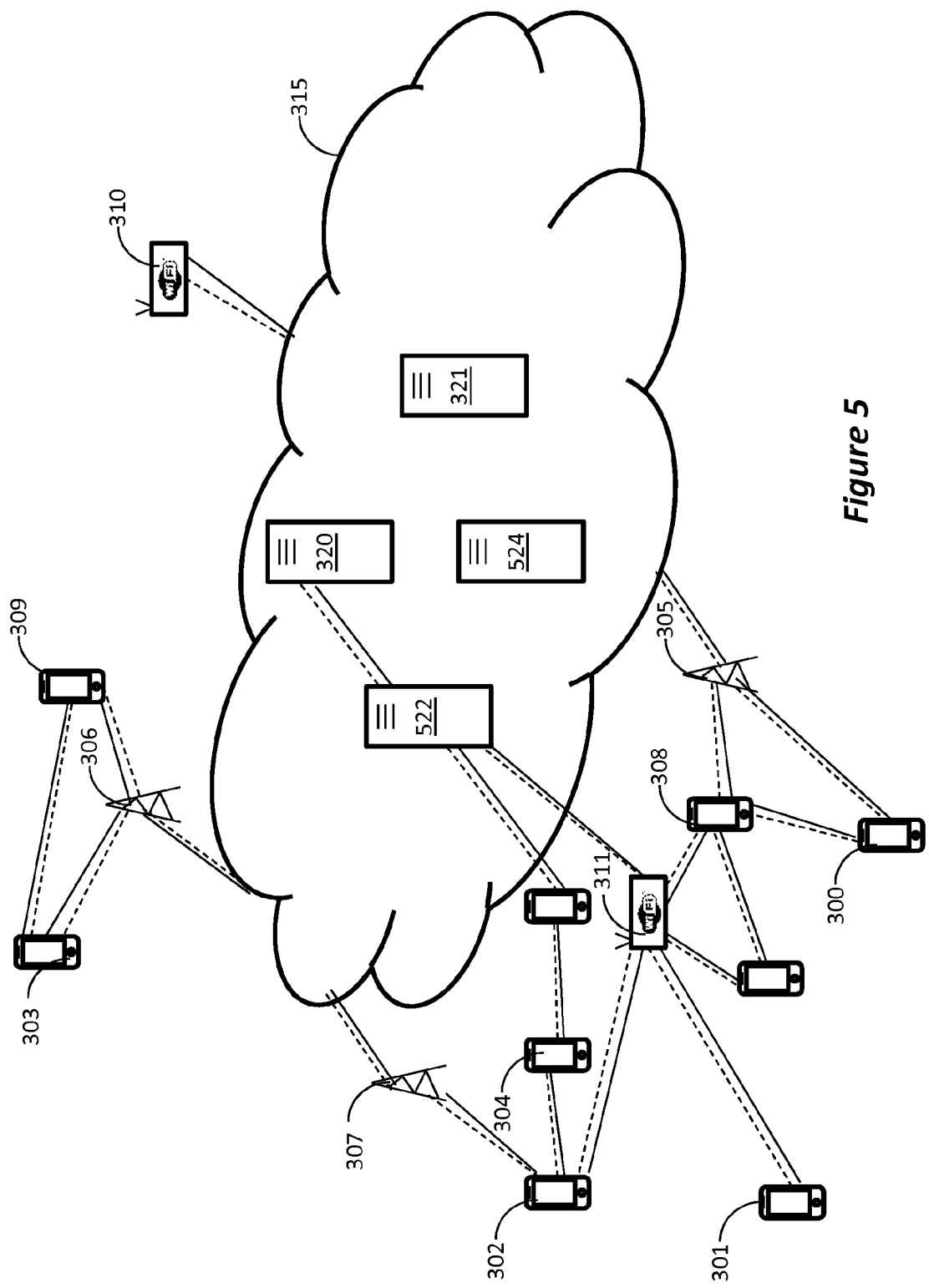
FIG. 5 illustrates an example of an environment for operating multiple connections according to the various embodiments disclosed herein and including a clout route oracle server.

In the embodiments illustrated in FIGS. 1-4, the method of virtual channel joining is implemented as a distributed system, wherein each device individually decides which selection scheme to use, makes its own decision as to which channels to utilize, and sets up its own connections. However, according to one embodiment, a cloud route oracle server is an optional part of the system and can be used to offload an arbitrary part of the mesh network routing protocol to a well-connected and well-provisioned server in the cloud, typically somewhere on the Internet. The example of FIG. 5 illustrates an environment wherein cloud route oracle server 524 services any queries about routes from the various devices in the system. These queries can be sent by devices directly or through other devices on the local network. A sample query may include request for information as to how to best get to a given device, queries regarding cost of various connections, bandwidth of various available services, and similar. Cloud route oracle server 524 retains some of the background information supplied in the queries and caches or stores it. Then oracle server 524 helps devices find other devices, choose routes, and weigh route and Internet exit characteristics.

The cloud route oracle server 524 may form part of the cloud exit server 522, or may be a separate and independent server. The cloud exit server 522 can be used to provide security, privacy, and speed improvements, and the channel joining benefit to traffic that is even completely opaque and remains unclassified by the system. Cloud exit server 524 can also be applicable to classified traffic, where its understood nature can be used to improve speed. For example, HTTP traffic can have comments stripped and variable names shortened in JavaScript, the size of images reduced by dropping metadata, converting to a more efficient image format, discarding some information encoded in the image that is unlikely to be visible to the human eye, and video traffic re-encoded better.

When used with opaque traffic, the system with the cloud exit server 524 operates as follows. When a request is originated in a user application of a mobile device, the client residing in the mobile device attempts to decipher or classify the request. If the request is decipherable and the client can handle the request without the support of cloud exit server 524, the client handles the request. Otherwise, if the request is not decipherable, the packets of the request are encapsulated by the client of the originating mobile device and sent over one or multiple paths. The encapsulating packets have the address of the cloud exit server 524 as the destination, while the encapsulated packets have the target server address as the destination and the address of the mobile device as the originating address.

Error correction techniques can be used to ensure the encapsulated packets arrival at the cloud exit server 524. Many error-correcting codes, such as Reed Solomon codes in general can be suitable, but the following simple technique also works well in practice: when more than two paths are available, use one of the paths to send the exclusive OR of packets sent on other paths. If one of the packets fails to arrive, it can be reconstructed by taking the exclusive OR of packets that did arrive. Under this scheme, the loss of two packets still requires a retransmission, but the combination of low overhead and low probability of retransmission makes this mechanism attractive.

When the encapsulated packets arrive at the cloud exit server 524, they are decapsulated to expose the target address and originating address. The now decapsulated packets are directed to the target server using the target address as the destination and the cloud exit server 524 address as the originating. The replies are then directed by the target server to the Cloud Exit server 524. As the replies arrive at the cloud exit server 524, sends them to the originating device using any available channels, i.e., not necessarily the same channels form which the requests were received by the cloud exit server 524.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A method for enabling multi-channel communication with a mobile device, the mobile device having a processor and a memory, executing a user application, the method comprising:
   providing a main application residing on a network-connected server;
   causing the mobile device, using a client application, to perform a process comprising:
   (a) intercepting a request generated by the user application;
   (b) analyzing the request to determine whether the request is decipherable and can be processed by the client application;
   (c) when the request is not decipherable and cannot be processed by the client application, encapsulating the request as a first encapsulated partial request inside a first encapsulation packet and a second encapsulated partial request inside a second encapsulation packet, wherein the first encapsulated partial request contains a target address, the first encapsulation packet contains an address of the network-connected server as its destination, the second encapsulated partial request contains the target address, and the second encapsulation packet contains the address of the network-connected server as its destination;
   (d) sending the first encapsulated partial request to the network-connected server via a first intermediary device; and
   (e) sending the second encapsulated partial request to the network-connected server via a second intermediary device;
   receiving, by the main application, the first encapsulated partial request from the first intermediary device, the first encapsulated partial request being originated and sent from the mobile device and containing an originating address of the request;
   receiving, by the main application, the second encapsulated partial request from the second intermediary device, the second encapsulated partial request being originated and sent from the mobile device and containing the originating address of the request;
   decapsulating, by the main application, the first encapsulated partial request to obtain a first decapsulated partial request and determining the originating address and the target address from the first decapsulated partial request;
   decapsulating, by the main application, the second encapsulated partial request to obtain a second decapsulated partial request;
   assembling the first decapsulated partial request and the second decapsulated partial request into an assembled decapsulated request corresponding to the original request generated by the user application on the mobile device;
   sending the assembled decapsulated request to the target using the target address and including the network-connected server as a request originator;
   receiving a response to the assembled decapsulated request from the target; and
   forwarding the response to the mobile device using the originating address of the request.

2. The method of claim 1, further comprising sending the request from the client application to the target address when the request is decipherable.

3. The method of claim 1, further comprising sending the request from the client application to the target address a plurality of times using a plurality of channels when the request is decipherable and the request is an idempotent request.

4. The method of claim 1, further comprising:
   when the request is decipherable, splitting the request into a plurality of sub-requests; and sending the plurality of sub-requests from the client application to the target address using a plurality of channels.

5. The method of claim 1, further comprising:
   when the request is decipherable, sending the request from the client application to the target address; and following receipt of a reply to the request, storing at least part of the reply in a cache memory.

6. The method of claim 5, further comprising:
   receiving a forward request from a second mobile device;
   determining whether a forward reply to the forward request is stored in the cache memory as a cached reply; and
   if the cached reply is stored in the cache memory, sending the cached reply to the second mobile device without sending the forward request to the target address.

7. The method of claim 1, further comprising:
   sending the request from the client application to the target address via a second mobile device when the request is decipherable; and
   following receipt of a reply to the request at the second mobile device, storing at least part of the reply in a cache memory of the second mobile device.

8. The method of claim 1, further comprising:
   sending the request from the client application to the target address via a second mobile device when the request is decipherable; and
   following receipt of the request by the second mobile device, determining whether a reply to the request is stored in a cache memory of the second mobile device as a cached reply; and if the cached reply is stored in the cache memory, fetching the cached reply from the cache memory of the second mobile device and sending the cached reply to the mobile device.

9. The method of claim 1, further comprising:
   determining if the request is decipherable to contain a plurality of sub-requests;
   determining whether a reply to at least one sub-request of the plurality of sub-requests is stored in a cache memory as a cached reply; and
   if the cached reply is stored in the cache memory, providing the cached reply to the user application and sending remaining sub-requests other than the at least one sub-request to the target address.

10. The method of claim 9, wherein the plurality of sub-requests are sent via a plurality of communications channels and wherein at least one of the communication channels comprises an ad-hoc connection to a second mobile device.

\* \* \* \* \*